(12) United States Patent
Kojima et al.

(10) Patent No.: US 11,682,128 B2
(45) Date of Patent: Jun. 20, 2023

(54) FACE IMAGE PROCESSING DEVICE AND FACE IMAGE PROCESSING PROGRAM

(71) Applicant: AISIN CORPORATION, Kariya (JP)

(72) Inventors: Shin-ichi Kojima, Nagakute (JP); Yuya Yamada, Kariya (JP); Shin Osuga, Kariya (JP); Koki Ueda, Kariya (JP); Yuta Kawai, Kariya (JP); Takashi Kato, Kariya (JP); Yoshiyuki Yamada, Kariya (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 141 days.

(21) Appl. No.: 17/201,487

(22) Filed: Mar. 15, 2021

(65) Prior Publication Data

US 2021/0312648 A1  Oct. 7, 2021

(30) Foreign Application Priority Data

Apr. 1, 2020 (JP) ................................. 2020-066196

(51) Int. Cl.
*G06K 9/00* (2022.01)
*G06T 7/50* (2017.01)
(Continued)

(52) U.S. Cl.
CPC .................. *G06T 7/50* (2017.01); *G06T 7/70* (2017.01); *G06V 10/764* (2022.01); *G06V 10/82* (2022.01);
(Continued)

(58) Field of Classification Search
CPC ....................................................... G06T 7/50
See application file for complete search history.

(56) References Cited

U.S. PATENT DOCUMENTS 9,786,030 B1* 10/2017 Binder .................. G06T 3/0093
2013/0230235 A1* 9/2013 Tateno .................. G06T 19/003
382/154
(Continued)

FOREIGN PATENT DOCUMENTS

WO  WO-2019213459 A1 * 11/2019  ......... G06K 9/00248

OTHER PUBLICATIONS

David Cristinacce et al., "Feature Detection and Tracking with Constrained Local Models", University of Manchester, Proc. British Machine Vision Conference, vol. 3, pp. 929-938, 2006, 10 pages.
(Continued)

*Primary Examiner* — Hadi Akhavannik
(74) *Attorney, Agent, or Firm* — Sughrue Mion, PLLC

(57) ABSTRACT

A face image processing device, includes: an image coordinate system coordinate value derivation unit detecting an x-coordinate value and a y-coordinate value in an image coordinate system at a feature point of an organ of a face of a person in an image, and estimating a z-coordinate value, so as to derive three-dimensional coordinate values in the image coordinate system; a camera coordinate system coordinate value derivation unit deriving three-dimensional coordinate values in a camera coordinate system from the three-dimensional coordinate values in the image coordinate system derived by the image coordinate system coordinate value derivation unit; and a parameter derivation unit applying the three-dimensional coordinate values in the camera coordinate system derived by the camera coordinate system coordinate value derivation unit to a predetermined three-dimensional face shape model to derive a model parameter of the three-dimensional face shape model in the camera coordinate system.

8 Claims, 4 Drawing Sheets

(51) Int. Cl.
*G06T 7/70* (2017.01)
*G06V 10/764* (2022.01)
*G06V 10/82* (2022.01)
*G06V 20/59* (2022.01)
*G06V 20/64* (2022.01)
*G06V 40/16* (2022.01)

(52) U.S. Cl.
CPC ............ *G06V 20/59* (2022.01); *G06V 20/647* (2022.01); *G06V 40/161* (2022.01); *G06V 40/171* (2022.01); *G06T 2207/20084* (2013.01); *G06T 2207/30201* (2013.01)

(56) References Cited

U.S. PATENT DOCUMENTS

| | | | |
|---|---|---|---|
| 2014/0093159 A1* | 4/2014 | Nguyen | G06T 19/20 382/154 |
| 2014/0168073 A1* | 6/2014 | Chizeck | G06T 15/405 345/156 |
| 2016/0202757 A1* | 7/2016 | Miao | G06F 3/013 348/78 |
| 2019/0118383 A1* | 4/2019 | Yoshiura | G06T 7/73 |
| 2019/0223728 A1* | 7/2019 | Heidari | A61B 5/7267 |
| 2021/0158023 A1* | 5/2021 | Fu | G06V 40/165 |

OTHER PUBLICATIONS

Jason M. Saragih et al., "Face Alignment through Subspace Constrained Mean-Shifts," The Robotics Institute, Carnegie Mellon University, International Conference on Computer Vision (ICCV) 2009, 4 pages.

Tadas Baltrusaitis et al., "3D Constrained Local Model for Rigid and Non-Rigid Facial Tracking," University of Cambridge Computer Laboratory, Conference on Computer Vision and Pattern Recognition (CVPR) 2012, 4 pages.

* cited by examiner

FACE IMAGE PROCESSING DEVICE AND FACE IMAGE PROCESSING PROGRAM

CROSS REFERENCE TO RELATED APPLICATIONS

This application is based on and claims priority under 35 U.S.C. § 119 to Japanese Patent Application 2020-066196, filed on Apr. 1, 2020, the entire content of which is incorporated herein by reference.

TECHNICAL FIELD

This disclosure relates to a face image processing device and a face image processing program.

BACKGROUND DISCUSSION

In the related art, there have been the following techniques as a technique for deriving model parameters in a camera coordinate system of a three-dimensional face shape model by using a face image acquired by imaging a face of a person.

J. M. Saragih, S. Lucey and J. F. Cohn, "Face Alignment through Subspace Constrained Mean-Shifts", International Conference on Computer Vision (ICCV) 2009 (Reference 1) discloses a technique for estimating parameters by using feature points detected from a face image and projection errors of image projection points of vertexes of a three-dimensional face shape model.

Further, T. Balrusaitis, P. Robinson and L.-P. Morency, "3D Constrained Local Model for Rigid and Non-Rigid Facial Tracking," Conference on Computer Vision and Pattern Recognition (CVPR) 2012 (Reference 2) discloses a technique for estimating parameters by using unevenness information of feature points detected from a face image and feature points acquired from a three-dimensional sensor, and projection errors of image projection points of vertexes of a three-dimensional face shape model.

However, in the technique disclosed in Reference 1, although optimization calculation is performed so as to minimize a distance error between each image observation point and each image projection point of the three-dimensional face shape model in a two-dimensional space, three-dimensional information is converted to two-dimensional information by projection conversion. For this reason, ambiguity occurs between an x-coordinate value and a z-coordinate value, and between a y-coordinate value and the z-coordinate value, and an estimation error due to the ambiguity is likely to occur. As a result, there is a problem that estimation accuracy of the parameters of the three-dimensional face shape model is not always sufficient.

Further, the technique disclosed in Reference 2 uses the three-dimensional sensor, and thus is vulnerable to disturbances such as sunlight, and in this technique as well, there is a problem that the estimation accuracy of the parameters of the three-dimensional face shape model is not always sufficient as a result.

A need thus exists for a face image processing device and a face image processing program which are not susceptible to the drawback mentioned above.

SUMMARY

A face image processing device according to a first aspect of this disclosure includes: an image coordinate system coordinate value derivation unit configured to detect an x-coordinate value which is a horizontal coordinate value and a y-coordinate value which is a vertical coordinate value respectively in an image coordinate system at a feature point of an organ of a face of a person in an image acquired by imaging the face, and estimate a z-coordinate value which is a depth coordinate value in the image coordinate system, so as to derive three-dimensional coordinate values in the image coordinate system; a camera coordinate system coordinate value derivation unit configured to derive three-dimensional coordinate values in a camera coordinate system from the three-dimensional coordinate values in the image coordinate system derived by the image coordinate system coordinate value derivation unit; and a parameter derivation unit configured to apply the three-dimensional coordinate values in the camera coordinate system derived by the camera coordinate system coordinate value derivation unit to a predetermined three-dimensional face shape model to derive a model parameter of the three-dimensional face shape model in the camera coordinate system.

A face image processing program according to an eighth aspect of this disclosure causes a computer to execute processing of: detecting an x-coordinate value which is a horizontal coordinate value and a y-coordinate value which is a vertical coordinate value respectively in an image coordinate system at a feature point of an organ of a face of a person in an image acquired by imaging the face, and estimating a z-coordinate value which is a depth coordinate value in the image coordinate system, so as to derive three-dimensional coordinate values in the image coordinate system; deriving three-dimensional coordinate values in a camera coordinate system from the derived three-dimensional coordinate values in the image coordinate system; and applying the derived three-dimensional coordinate values in the camera coordinate system to a predetermined three-dimensional face shape model to derive a model parameter of the three-dimensional face shape model in the camera coordinate system.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, embodiments related to a disclosed technique are described with reference to the drawings.

First Embodiment

The present embodiment describes an example of a case where a parameter of a three-dimensional face shape model of a person is estimated using a captured image captured by imaging a head of the person. Further, in the present embodiment, as an example of a parameter of the three-dimensional face shape model of the person, a parameter of a three-dimensional face shape model of an occupant of a vehicle such as an automobile as a moving body is estimated by a face image processing device.

Figure 1:
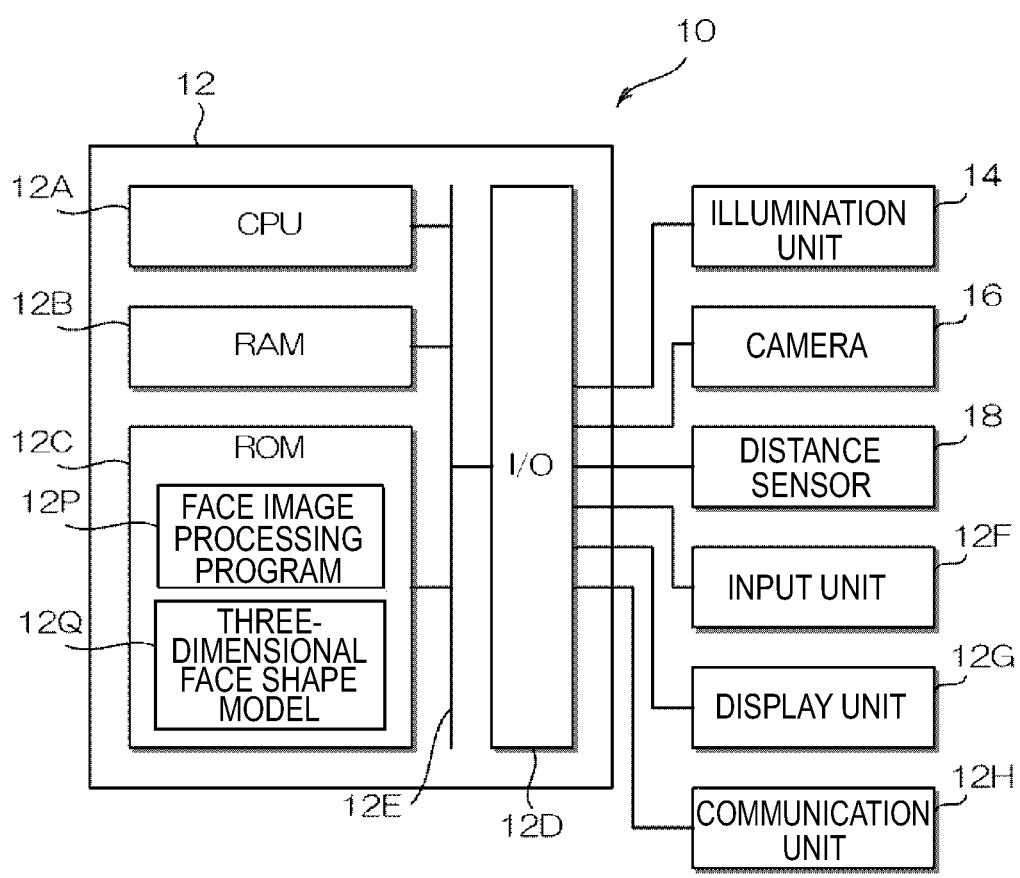
FIG. 1 is a block diagram showing an example of a configuration in which a face image processing device according to an embodiment is implemented by a computer.

FIG. 1 shows an example of a configuration in which a face image processing device 10 operating as a face image processing device according to the disclosed technique is implemented by a computer.

As shown in FIG. 1, the computer operating as the face image processing device 10 includes a device main body 12 equipped with a central processing unit (CPU) 12A, a random access memory (RAM) 12B, and a read only memory (ROM) 12C as processors. The ROM 12C includes a face image processing program 12P for implementing various functions for estimating a parameter of a three-dimensional face shape model. The device main body 12 includes an input and output interface (hereinafter referred to as an I/O) 12D, and the CPU 12A, the RAM 12B, the ROM 12C, and the VO 12D are connected with each other via a bus 12E such that commands and data can be exchanged. Further, an input unit 12F such as a keyboard and a mouse, a display unit 12G such as a display, and a communication unit 12H for communicating with an external device are connected to the I/O 12D. Further, an illumination unit 14 such as a near-infrared light emitting diode (LED) that illuminates the head of the occupant, a camera 16 that images the head of the occupant, and a distance sensor 18 that measures a distance to the head of the occupant are connected to the I/O 12D. Although not shown, a nonvolatile memory capable of storing various data can be connected to the I/O 12D.

The device main body 12 operates as the face image processing device 10 by the face image processing program 12P being read from the ROM 12C and expanded into the RAM 128, and the face image processing program 12P expanded in the RAM 12B being executed by the CPU 12A. The face image processing program 12P includes a process for implementing various functions for estimating the parameter of the three-dimensional face shape model (details will be described later).

Figure 2:
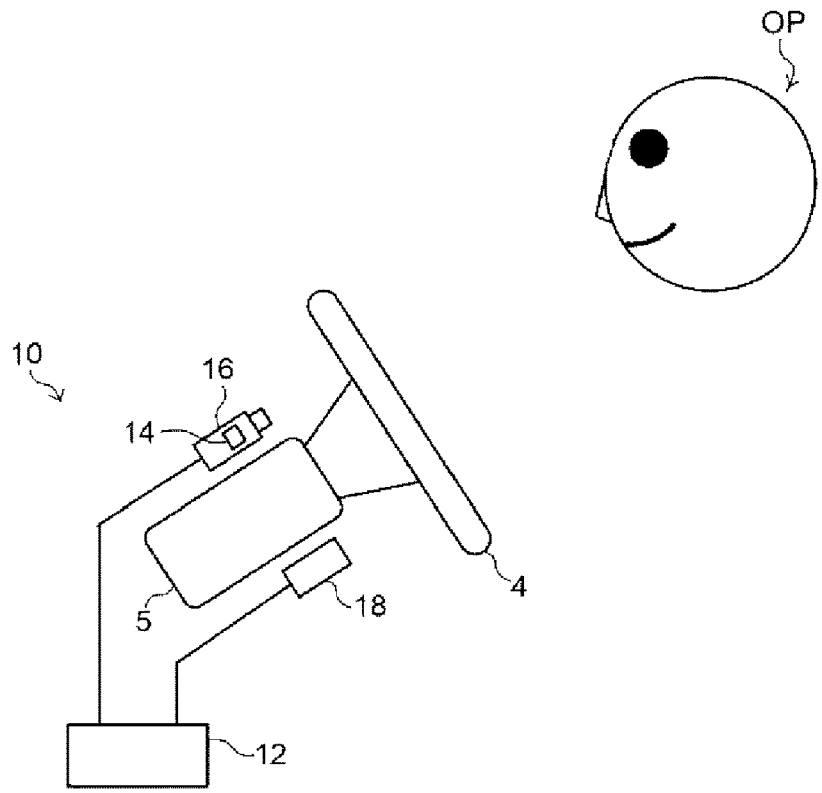
FIG. 2 is an image diagram showing an example of an arrangement of electronic devices of the face image processing device according to the embodiment.

FIG. 2 shows an example of an arrangement of electronic devices mounted on the vehicle as the face image processing device 10.

As shown in FIG. 2, the vehicle is equipped with the device main body 12 of the face image processing device 10, the illumination unit 14 for illuminating an occupant OP, the camera 16 for Imaging the head of the occupant OP, and the distance sensor 18. The arrangement example of the present embodiment shows a case where the illumination unit 14 and the camera 16 are disposed on an upper portion of a column 5 for holding a steering wheel 4 and the distance sensor 18 is disposed on a lower portion thereof.

Figure 3:
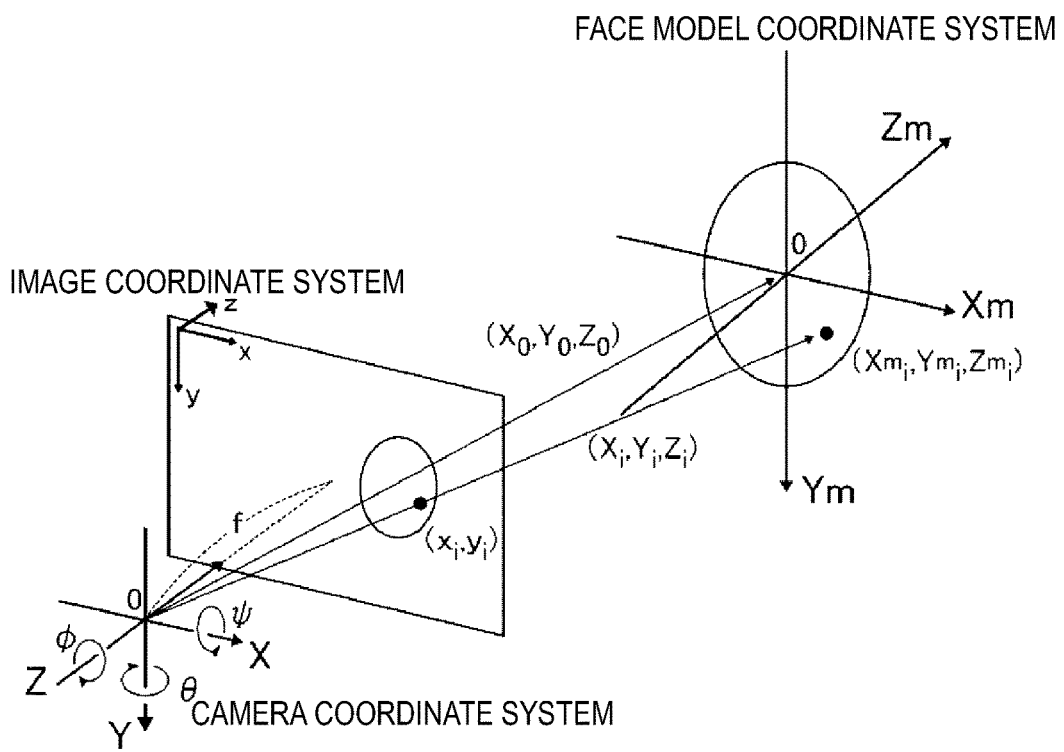
FIG. 3 is an image diagram showing an example of a coordinate system in the face image processing device according to the embodiment.

FIG. 3 shows an example of a coordinate system in the face image processing device 10.

A coordinate system for specifying a position differs depending on how an article as a center is handled. Examples include a coordinate system centered on a camera for Imaging a face of a person, a coordinate system centered on a captured image, and a coordinate system centered on a face of a person. In the following description, the coordinate system centered on the camera is referred to as a camera coordinate system, the coordinate system centered on the captured image is referred to as an image coordinate system, and the coordinate system centered on the face is referred to as a face model coordinate system. The example shown in FIG. 3 shows an example of a relationship between the camera coordinate system, the face model coordinate system, and the image coordinate system used in the face image processing device 10 according to the present embodiment.

In the camera coordinate system, the right side is an X direction, the lower side is a Y direction, and the front side is a Z direction when viewed from the camera 16, and an origin is a point derived by calibration. The camera coordinate system is defined such that directions of an x-axis, a y-axis, and a z-axis coincide with those in the image coordinate system whose origin is the upper left of the image.

The face model coordinate system is a coordinate system for expressing positions of parts such as eyes and a mouth in the face. For example, face image processing generally uses a technique of using data called a three-dimensional face shape model in which a three-dimensional position of each characteristic part of a face such as eyes and a mouth is described, projecting such data onto an image, and estimating a position and an orientation of the face by combining the positions of the eyes and the mouth. An example of the coordinate system set in the three-dimensional face shape model is the face model coordinate system, and the left side is an Xm direction, the lower side is an Ym direction, and the rear side is a Zm direction when viewed from the face.

An interrelationship between the camera coordinate system and the image coordinate system is predetermined, and coordinate conversion is possible between the camera coordinate system and the image coordinate system. The interrelationship between the camera coordinate system and the face model coordinate system can be specified by using estimation values of the position and the orientation of the face.

On the other hand, as shown in FIG. 1, the ROM 12C includes a three-dimensional face shape model 12Q. The three-dimensional face shape model 12Q according to the present embodiment is formed of a linear sum of an average shape and a basis, and the basis is separated into an individual difference basis (a component that does not change with time) and a facial expression basis (a component that changes with time).

That is, the three-dimensional face shape model 12Q according to the present embodiment is expressed by the following Equation (1).

$$x_i = x^m{}_i + E^{id}{}_i p^{id} + E^{exp}{}_i p^{exp} \tag{1}$$

i: vertex number (0 to L−1)
$x_i$: i-th vertex vector (three dimensional)
$x^m{}_i$: i-th reference vertex vector (three dimensional)

$E^{id}_i$: matrix in which M1 individual difference basis vectors corresponding to i-th vertex vector are arranged (3× M1 dimensions)

$p^{id}$: parameter vector of individual difference basis (M1 dimensions)

$E^{exp}_i$: matrix in which M2 facial expression basis vectors corresponding to i-th vertex vector are arranged (3× M2 dimensions)

$p^{exp}$: parameter vector of facial expression basis (M2 dimensions)

Further, the conversion of the three-dimensional face shape model 12Q to the camera coordinate system is performed by the following Equation (2). In Equation (2), R expresses a rotation matrix and t expresses a translation vector.

$$x_{c\_i} = Ex_i + t \quad (2)$$

Figure 4:
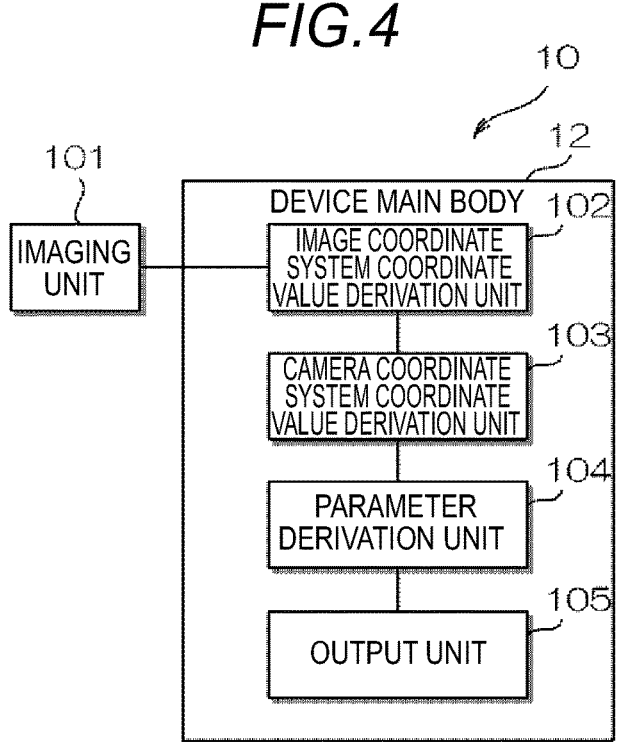
FIG. 4 is a block diagram showing an example of a configuration in which a device main body of a face image processing device according to a first embodiment is functionally classified.

FIG. 4 shows an example of a block configuration in which the device main body 12 of the face image processing device 10 according to the present embodiment is classified into functional configurations.

As shown in FIG. 4, the device main body 12 includes functional units such as an imaging unit 101 such as a camera, an image coordinate system coordinate value derivation unit 102, a camera coordinate system coordinate value derivation unit 103, a parameter derivation unit 104, and an output unit 105.

The imaging unit 101 is a functional unit that images a face of a person to capture an image, and outputs the captured image to the image coordinate system coordinate value derivation unit 102. In the present embodiment, the camera 16, which is an example of an imaging device, is used as an example of the imaging unit 101. The camera 16 images the head of the occupant OP of the vehicle and outputs the captured image. In the present embodiment, a camera that captures a monochrome image is applied as the camera 16, but this disclosure is not limited to this, and a camera that captures a color image may be applied as the camera 16.

Further, the image coordinate system coordinate value derivation unit 102 detects an x-coordinate value which is a horizontal coordinate value and a y-coordinate value which is a vertical coordinate value of the image coordinate system at each feature point of each organ of the face of the person in the captured image. Further, the image coordinate system coordinate value derivation unit 102 estimates a z-coordinate value which is a depth coordinate value of the image coordinate system. The image coordinate system coordinate value derivation unit 102 derives three-dimensional coordinate values of the image coordinate system by detecting the x-coordinate value and the y-coordinate value and estimating the z-coordinate value. The image coordinate system coordinate value derivation unit 102 according to the present embodiment derives the z-coordinate value by estimating the z-coordinate value using deep learning in parallel with the detection of the x-coordinate value and the y-coordinate value.

Further, the camera coordinate system coordinate value derivation unit 103 derives three-dimensional coordinate values in the camera coordinate system from the three-dimensional coordinate values of the image coordinate system derived by the image coordinate system coordinate value derivation unit 102.

Further, the parameter derivation unit 104 applies the three-dimensional coordinate values in the camera coordinate system derived by the camera coordinate system coordinate value derivation unit 103 to the three-dimensional face shape model 12Q to derive a model parameter of the three-dimensional face shape model 12Q in the camera coordinate system. In the present embodiment, as the model parameter, a parameter of the individual difference basis and a parameter of the facial expression basis of the three-dimensional face shape model 12Q, and a position and orientation parameter indicating the position and the orientation of the face of the person as viewed from the camera 16 are applied.

Further, the output unit 105 outputs information indicating the model parameter of the three-dimensional face shape model 12Q of the person derived by the parameter derivation unit 104.

Next, an operation of the face image processing device 10 that estimates the parameter of the three-dimensional face shape model 12Q will be described. In the present embodiment, the face image processing device 10 is operated by the device main body 12 of the computer.

Figure 5:
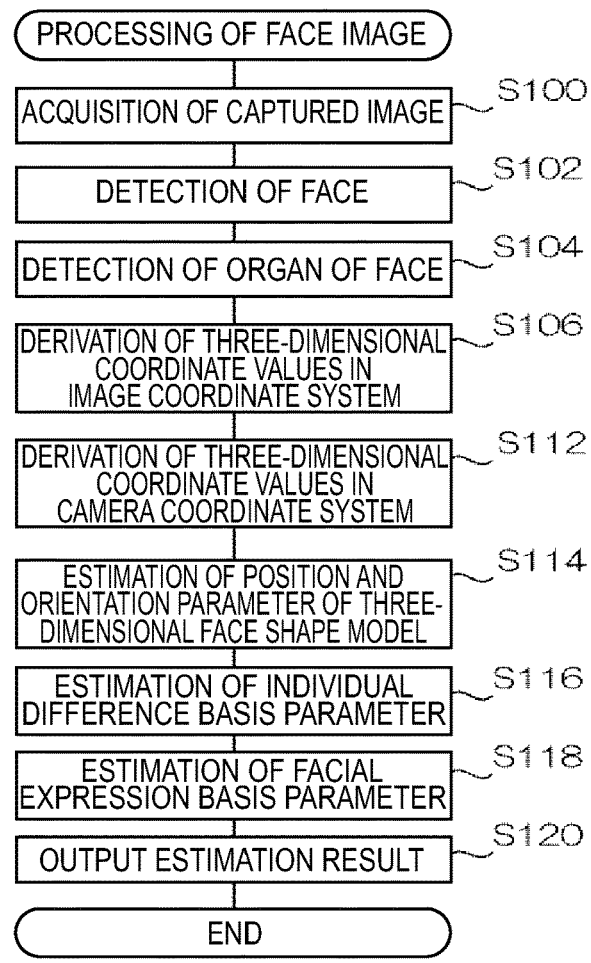
FIG. 5 is a flowchart showing an example of a processing flow by a face image processing program according to the first embodiment.

FIG. 5 shows an example of a processing flow by the face image processing program 12P in the face image processing device 10 implemented by the computer. In the device main body 12, the face image processing program 12P is read from the ROM 12C and expanded in the RAM 12B, and the CPU 12A executes the face image processing program 12P expanded in the RAM 12B.

First, in step S100, the CPU 12A executes acquisition processing of the image captured by the camera 16. Processing of the step S100 is an example of an operation of acquiring the captured image output by the imaging unit 101 shown in FIG. 4.

In the next step S102, the CPU 12A detects a rectangular region surrounding the face of the person (in the present embodiment, the occupant OP) from the captured image. In the present embodiment, the detection of the rectangular region is performed by the technique described in "P. Viola and M. Jones, "Rapid Object Detection using a Boosted Cascade of Simple Features", Conference on Computer Vision and Pattern Recognition (CVPR) 2001". Since the technique for detecting the rectangular region surrounding the face is a widely practiced technique, further description thereof will be omitted here.

In the next step S104, the CPU 12A detects feature points of a plurality of organs of the face in the inside of the rectangular region surrounding the detected face. In the present embodiment, two organs, the eyes and the mouth, are applied as the plurality of organs, but the disclosure is not limited to this. In addition to these organs, other organs such as the nose and ears may be included, and a plurality of combinations of the above organs may be applied.

In the next step S106, the CPU 12A detects the x-coordinate value and the y-coordinate value of each detected feature point of each organ in the image coordinate system, and estimates the z-coordinate value in the image coordinate system, so as to derive the three-dimensional coordinate values of each feature point of each organ in the image coordinate system. In the present embodiment, the derivation of the three-dimensional coordinate values in the image coordinate system is performed by using the technique described in "Y. Sun, X. Wang and X. Tang, "Deep Convolutional Network Cascade for Facial Point Detection", Conference on Computer Vision and Pattern Recognition (CVPR) 2013". In the technique, the x-coordinate value and the y-coordinate value of each feature point are detected by deep learning, and the z-coordinate value can also be estimated by adding the z-coordinate value to learning data. Since the technique for deriving the three-dimensional coordinate values in the image coordinate system is also a widely practiced technique, further description thereof is omitted here.

In the next step S112, the CPU 12A derives three-dimensional coordinate values in the camera coordinate system from the three-dimensional coordinate values in the image coordinate system acquired in the processing of step S106. In the present embodiment, the three-dimensional coordinate values in the camera coordinate system are derived by calculation using the following Equations (3) to (5). In the present embodiment, an average distance from the camera 16 to the occupant OP, which is acquired by the distance sensor 18, is applied as a temporary distance d to the face in Equation (3).

$$Z^0_k = \left(\frac{z_k}{f} + 1\right)d \tag{3}$$

$$X^0_k = (x_k - x_c)\frac{z^0_k}{f} \tag{4}$$

$$Y^0_k = (y_k - y_c)\frac{z^0_k}{f} \tag{5}$$

k: observation point number (0 to N−1)
N: total number of observation points
$X^o_k$, $Y^o_k$, $Z^o_k$: xyz coordinates of observation point in camera coordinate system
$x_k$, $y_k$, $z_k$: xyz coordinates of observation point in image coordinate system
$x_c$, $y_c$: image center
f: focal length in pixels
d: temporary distance to face In the next step S114, the CPU 12A applies the three-dimensional coordinate values of the camera coordinate system acquired in the processing of step S112 to the three-dimensional face shape model 12Q to estimate the position and orientation parameter of the three-dimensional face shape model 12Q in the camera coordinate system.

In the present embodiment, prior to the estimation of the position and orientation parameter, an evaluation function g that quantifies the degree of resemblance between each observation point and the three-dimensional face shape model 12Q is defined by using the three-dimensional coordinate values of each feature point of the face image in the image coordinate system derived by the processing of step S106 and three-dimensional coordinate values of vertexes of the corresponding three-dimensional face shape model 12Q converted to the camera coordinate system.

For example, a sum of squares of a distance error between each observation point and each model point can be used as the evaluation function g as shown in Equation (6) below.

$$g = \sum_{k=0}^{N-1} \left\| x^0_k - (Rx_k + t) \right\|^2 \tag{6}$$

k: observation point number (0 to N−1)
$X^o_k$: observation point vector in camera coordinate system
k: vertex number of face shape model corresponding to k-th observation point
$x_k$: vertex vector of face shape model corresponding to k-th observation point
R: rotation matrix for converting from face model coordinate system to camera coordinate system
t: translation vector for converting from face model coordinate system to camera coordinate system Equation (6) is expressed as a vector component, and the evaluation function g is expressed by the following Equation (7).

$$g = \sum_{k=0}^{N-1} \left( \begin{array}{l} (X^0_k - (Xm_k r_{11} + Ym_k r_{12} + Zm_k r_{13} + X_0))^2 \\ +(Y^0_k - (Xm_k r_{21} + Ym_k r_{22} + Zm_k r_{23} + Y_0))^2 \\ +(Z^0_k - (Xm_k r_{31} + Ym_k r_{32} + Zm_k r_{33} + Z_0))^2 \end{array} \right) \tag{7}$$

$X^o_k$, $Y^o_k$, $Z^o_k$: component of observation point vector $x^o_k$ in camera coordinate system
$Xm_k$, $Ym_k$, $Zm_k$: component of vertex vector $x_k$ of face shape model corresponding to k-th observation point
r11, . . . , r33: component of rotation matrix R for converting from face model coordinate system to camera coordinate system
$X_0$, $Y_0$, $Z_0$: component of translation vector t for converting from face model coordinate system to camera coordinate system Here, components $r_{11}$, . . . , $r_{33}$ of a rotation matrix R are expressed by the following Equation (8).

$$\begin{pmatrix} r_{11} & r_{12} & r_{13} \\ r_{21} & r_{22} & r_{23} \\ r_{31} & r_{32} & r_{33} \end{pmatrix} = \tag{8}$$

$$\begin{pmatrix} \cos\theta\cos\phi & \sin\psi\sin\theta\cos\phi - \cos\psi\sin\phi & \cos\psi\sin\theta\cos\phi + \sin\psi\sin\phi \\ \cos\theta\sin\phi & \sin\psi\sin\theta\sin\phi + \cos\psi\cos\phi & \cos\psi\sin\theta\sin\phi - \sin\psi\cos\phi \\ -\sin\theta & \sin\psi\cos\theta & \cos\psi\cos\theta \end{pmatrix}$$

Ψ, θ, φ: rotation angle around X-axis, Y-axis and Z-axis of face shape model in camera coordinate system A value of the parameter of the three-dimensional face shape model 12Q to be acquired is a value that minimizes the evaluation function g. Therefore, when the parameter to be acquired is α, a partial differentiation (∂g/∂α) of the evaluation function g with respect to α is calculated. When the equation (∂g/∂α)=0 can be solved by α, the solution of (∂g/∂α)=0 is the α to be acquired, and when the equation (∂g/∂α)=0 cannot be solved by α, a value acquired by an optimization method such as a steepest descent method is the α to be acquired.

An equation, in which a partial differentiation of the evaluation function g with respect to each of components $X_0$, $Y_0$, and $Z_0$ of a translation vector $t=(X_0, Y_0, Z_0)^T$ is set to =0, can be solved. The translation vector $t=(X_0, Y_0, Z_0)^T$, which is a position parameter, can be calculated by the following Equations (9) to (11).

$$X_0 = \frac{1}{N}\sum_{k=0}^{N-1}(X^0_k - (Xm_k r_{11} + Ym_k r_{12} + Zm_k r_{13})) \tag{9}$$

$$Y_0 = \frac{1}{N}\sum_{k=0}^{N-1}(Y^0_k - (Xm_k r_{21} + Ym_k r_{22} + Zm_k r_{23})) \tag{10}$$

$$Z_0 = \frac{1}{N}\sum_{k=0}^{N-1}(Z^0_k - (Xm_k r_{31} + Ym_k r_{32} + Zm_k r_{33})) \tag{11}$$

An equation, in which a partial differentiation of the evaluation function g with respect to each of rotation angles Ψ, θ, and φ of the rotation matrix R as orientation parameters is set to =0, cannot be solved. Therefore, the rotation angles $\Psi$, $\theta$, and $\varphi$ of the rotation matrix R as the orientation parameters are acquired by applying partial differential equations of Equations (12) to (14) to optimization by repeated calculation such as the steepest descent method.

$$\frac{\partial g}{\partial \psi} = \sum_{k=0}^{N-1} \begin{pmatrix} 2h_k^x(-Ym_k r_{13} + Zm_k r_{12}) \\ +2h_k^y(-Ym_k r_{23} + Zm_k r_{22}) \\ +2h_k^z(-Ym_k r_{33} + Zm_k r_{32}) \end{pmatrix} \tag{12}$$

$$\frac{\partial g}{\partial \theta} = \sum_{k=0}^{N-1} \begin{pmatrix} 2h_k^x(Xm_k\sin\theta\cos\phi - Ym_k(\sin\psi\cos\theta\cos\phi) - Zm_k(\cos\psi\cos\theta\cos\phi)) \\ +2h_k^y(Xm_k\sin\theta\sin\phi - Ym_k(\sin\psi\cos\theta\sin\phi) - Zm_k(\cos\psi\cos\theta\sin\phi)) \\ +2h_k^z(Xm_k\cos\theta + Ym_k\sin\psi\sin\theta + Zm_{kk}\cos\psi\sin\theta) \end{pmatrix} \tag{13}$$

$$\frac{\partial g}{\partial \phi} = \sum_{k=0}^{N-1} \begin{pmatrix} 2h_k^x(Xm_k r_{21} + Ym_k r_{22} + Zm_k r_{23}) \\ -2h_k^y(Xm_k r_{11} + Ym_k r_{12} + Zm_k r_{13}) \end{pmatrix} \tag{14}$$

Here, $h^x_k$, $h^y_k$, and $h^z_k$ are values expressed by the following Equations (15) to (17).

$$h^x_k = X^o_k - (Xm_k r_{11} + Ym_k r_{12} + Zm_k r_{13} X_0) \tag{15}$$

$$h^y_k = Y^o_k - (Xm_k r_{21} + Ym_k r_{22} + Zm_k r_{23} Y_0) \tag{16}$$

$$h^z_k = Z^o_k - (Xm_k r_{31} + Ym_k r_{32} + Zm_k r_{33} Z_0) \tag{17}$$

In the next step S116, the CPU 12A applies the three-dimensional coordinate values of the camera coordinate system acquired in the processing of step S112 to the three-dimensional face shape model 12Q to estimate the parameter of the individual difference basis of the three-dimensional face shape model 12Q in the camera coordinate system. In the present embodiment, a parameter $p^{id}$ of the individual difference basis is calculated by the following Equation (18). $P_j$ in Equation (18) is to be replaced by $p^{id}_j$.

$$p_j = \frac{\sum_{k=0}^{N-1} \begin{pmatrix} (X^0_k - ((Xm_k - p_j X^e_{k,j})r_{11} + (Ym_k - p_j Y^e_{k,j})r_{12} + (Zm_k - p_j Z^e_{k,j})r_{13} + X_0))l^x_{k,j} \\ +(Y^0_k - ((Xm_k - p_j X^e_{k,j})r_{21} + (Ym_k - p_j Y^e_{k,j})r_{22} + (Zm_k - p_j Z^e_{k,j})r_{23} + Y_0))l^y_{k,j} \\ +(Z^0_k - ((Xm_k - p_j X^e_{k,j})r_{31} + (Ym_k - p_j Y^e_{k,j})r_{32} + (Zm_k - p_j Z^e_{k,j})r_{33} + Z_0))l^z_{k,j} \end{pmatrix}}{\sum_{k=0}^{N-1} \begin{pmatrix} (l^x_{k,j})^2 \\ +(l^y_{k,j})^2 \\ +(l^z_{k,j})^2 \end{pmatrix}} \tag{18}$$

Here, $l^x_{k,j}$, $l^y_{k,j}$, $l^z_{k,j}$ are values expressed by the following Equations (19) to (21).

$$l^x_{k,j} = (X^e_{k,j} r_{11} + Y^e_{k,j} r_{12} + Z^e_{k,j} r_{13}) \tag{19}$$

$$l^y_{k,j} = (X^e_{k,j} r_{21} + Y^e_{k,j} r_{22} + Z^e_{k,j} r_{23}) \tag{20}$$

$$l^z_{k,j} = (X^e_{k,j} r_{31} + Y^e_{k,j} r_{32} + Z^e_{k,j} r_{33}) \tag{21}$$

In the next step S118, the CPU 12A applies the three-dimensional coordinate values of the camera coordinate system acquired in the processing of step S112 to the three-dimensional face shape model 12Q to estimate the facial expression basis parameter of the three-dimensional face shape model 12Q in the camera coordinate system. In the present embodiment, a facial expression basis parameter $p^{exp}$ is calculated by the following Equation (22). $P_j$ in Equation (22) is to be replaced by $p^{exp}_j$.

$$p_j = \frac{\sum_{k=0}^{N-1} \begin{pmatrix} (X^0_k - ((Xm_k - p_j X^e_{k,j})r_{11} + (Ym_k - p_j Y^e_{k,j})r_{12} + (Zm_k - p_j Z^e_{k,j})r_{13} + X_0))l^x_{k,j} \\ +(Y^0_k - ((Xm_k - p_j X^e_{k,j})r_{21} + (Ym_k - p_j Y^e_{k,j})r_{22} + (Zm_k - p_j Z^e_{k,j})r_{23} + Y_0))l^y_{k,j} \\ +(Z^0_k - ((Xm_k - p_j X^e_{k,j})r_{31} + (Ym_k - p_j Y^e_{k,j})r_{32} + (Zm_k - p_j Z^e_{k,j})r_{33} + Z_0))l^z_{k,j} \end{pmatrix}}{\sum_{k=0}^{N-1} \begin{pmatrix} (l^x_{k,j})^2 \\ +(l^y_{k,j})^2 \\ +(l^z_{k,j})^2 \end{pmatrix}} \tag{22}$$

In the next step S120, the CPU 12A outputs estimation values of various parameters derived by the processing of steps S114 to S118, and ends the processing routine.

The estimation values of various parameters output by the processing of step S120 are used for estimating the position and orientation of the occupant of the vehicle, tracking the face image, and the like.

As described above, according to the face image processing device of the present embodiment, the processing includes: detecting an x-coordinate value which is a horizontal coordinate value and a y-coordinate value which is a vertical coordinate value in an image coordinate system at each feature point of each organ of a face of a person in an image acquired by imaging the face, and estimating a z-coordinate value which is a depth coordinate value in the image coordinate system, so as to derive three-dimensional coordinate values in the image coordinate system; deriving three-dimensional coordinate values in a camera coordinate system from the derived three-dimensional coordinate values in the image coordinate system; and applying the derived three-dimensional coordinate values in the camera coordinate system to a predetermined three-dimensional face shape model to derive a model parameter of the three-dimensional face shape model in the camera coordinate system. Accordingly, as compared to a case of performing optimization calculation of minimizing a distance error between each image observation point and each image projection point of a three-dimensional face shape model in a two-dimensional space or a case of using a three-dimensional sensor, parameters of the three-dimensional face shape model can be estimated more accurately.

Second Embodiment

Next, a second embodiment will be described. The second embodiment is different from the first embodiment in that processing for estimating a distance to a face and processing for correcting a z-coordinate value in an image coordinate system are added, and an independent weight is set for each evaluation function g of a distance error of three-dimensional coordinate values at each feature point of each organ of the face. Since the second embodiment has a configuration substantially the same as that of the first embodiment, the same parts are denoted by the same reference numerals, and a detailed description thereof is omitted.

First, a functional configuration of the device main body 12 of the face image processing device 10 according to the second embodiment will be described.

Figure 6:
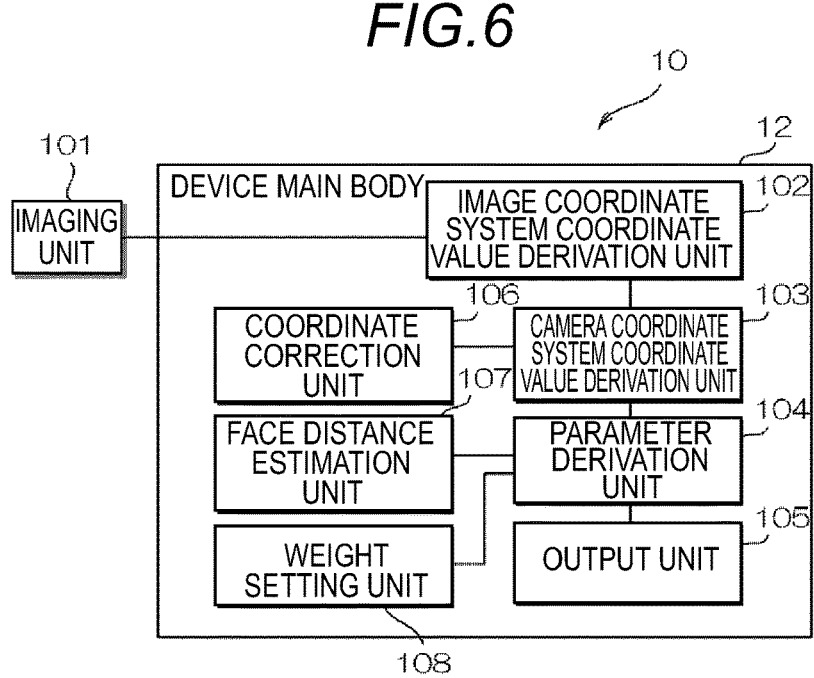
FIG. 6 is a block diagram showing an example of a configuration in which a device main body of a face image processing device according to a second embodiment is functionally classified.

As shown in FIG. 6, the device main body 12 of the face image processing device 10 according to the second embodiment is different from the device main body 12 of the face image processing device 10 according to the first embodiment only in that a coordinate correction unit 106, a face distance estimation unit 107, and a weight setting unit 108 are added.

The coordinate correction unit 106 corrects the z-coordinate value derived by the image coordinate system coordinate value derivation unit 102 according to a position of the face in the captured image.

Further, the face distance estimation unit 107 estimates a distance to the face of the person. In the face distance estimation unit 107 according to the present embodiment, the distance to the face of the person is estimated, such that the distance to the face of the person is derived more accurately by acquiring an enlargement and reduction coefficient of the three-dimensional face shape model 12Q and dividing the temporary distance d to the face by the enlargement and reduction coefficient.

Further, the weight setting unit 108 sets an independent weight for each evaluation function g for the error of the three-dimensional coordinates at each feature point of each organ of the face.

Next, the operation of the face image processing device 10 according to the second embodiment when estimating the parameter of the three-dimensional face shape model 12Q will be described. In the present embodiment, the face image processing device 10 is operated by the device main body 12 of the computer.

Figure 7:
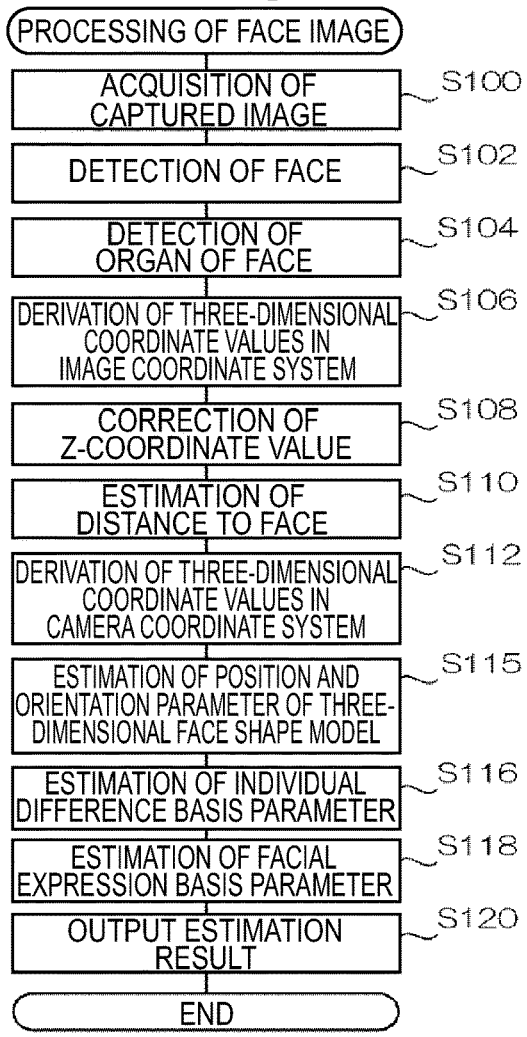
FIG. 7 is a flowchart showing an example of a processing flow by a face image processing program according to the second embodiment.

FIG. 7 shows an example of a processing flow by the face image processing program 12P in the face image processing device 10 according to the second embodiment implemented by the computer. The second embodiment is the same as the first embodiment in that, in the device main body 12, the face image processing program 12P is read from the ROM 12C and expanded in the RAM 12B, and the CPU 12A executes the face image processing program 12P expanded in the RAM 12B. In FIG. 7, steps in which the same processing as in FIG. 5 is performed are assigned the same step numbers as in FIG. 5, and the description thereof will be omitted.

As shown in FIG. 7, face image processing according to the second embodiment is different from the face image processing according to the first embodiment in that the processing of step S108 and step S110 is newly included and the processing of step S115 is applied instead of the processing of step S114.

In step S108, the CPU 12A corrects the z-coordinate value of the three-dimensional coordinate values in the image coordinate system derived by the processing of step S106.

That is, in the processing of step S106, since the position of the rectangular region of the face in the image is not taken into consideration, an error may occur in the estimation of the z-coordinate when the face deviates from the center. Therefore, in step S108, the error of the estimation value of the z-coordinate of each image feature point is corrected by the following Equation (23).

$$z \text{ correction amount} = \frac{(-x_0(x_k - x_c - x_0) - y_0(y_k - y_c - y_0))}{z_0} \quad (23)$$

$x_0$, $y_0$, $z_0$: observation or estimation value of image coordinate of representative point (for example, center of nose) in face shape model In step S110, the CPU 12A estimates the distance to the face of the person.

That is, when the enlargement and reduction coefficient of the three-dimensional face shape model 12Q is s, the enlargement and reduction coefficient s is acquired by the following Equation (24). By dividing the default temporary distance d to the face by the enlargement and reduction coefficient s, the distance to the face can be acquired based on a size of the three-dimensional face shape model 12Q.

$$s = \frac{\sum_{k=0}^{N-1} \begin{pmatrix} (X_k^0 - x)h_k^{s,x} \\ +(Y_k^0 - y)h_k^{s,y} \\ +(Z_k^0 - z)h_k^{s,z} \end{pmatrix}}{\sum_{k=0}^{N-1} \begin{pmatrix} (h_k^{s,x})^2 \\ +(h_k^{s,y})^2 \\ +(h_k^{s,z})^2 \end{pmatrix}} \quad (24)$$

wherein $$h^{s,x} = (X^m_k r_{11} + Y^m_k r_{12} + Z^m_k r_{13})$$

$$h^{s,y}_k = (X^m_k r_{21} + Y^m_k r_{22} + Z^m_k r_{23})$$

$$h^{s,z}_k = (X^m_k r_{31} + Y^m_k r_{32} + Z^m_k r_{33})$$

In step S115, the CPU 12A sets an independent weight for each evaluation function g for the error of the three-dimensional coordinates at each feature point of each organ of the face.

That is, weight coefficients $a_k$, $b_k$, and $c_k$ are set for the evaluation function g of the distance error shown in Equation (7) as shown in Equation (25) below. Here, $a_k$, $b_k$, and $c_k$ can be set for coordinates of each feature point. When an error at one feature point is to be set smaller than that of other feature points, by setting the weight coefficient set for the feature point larger than those of other feature points, a parameter is estimated such that the error of the feature point is smaller.

$$g = \sum_{k=0}^{N-1} \begin{pmatrix} a_k (X_k^0 - (Xm_k r_{11} + Ym_k r_{12} + Zm_k r_{13} + X_0))^2 \\ + b_k (Y_k^0 - (Xm_k r_{21} + Ym_k r_{22} + Zm_k r_{23} + Y_0))^2 \\ + c_k (Z_k^0 - (Xm_k r_{31} + Ym_k r_{32} + Zm_k r_{33} + Z_0))^2 \end{pmatrix} \quad (25)$$

In each of the above embodiments, the processor means a broadly defined processor, and includes a general-purpose processor (for example, CPU: central processing unit) and a dedicated processor (for example, GPU: graphics processing unit, ASIC: application specific integrated circuit, FPGA: field programmable gate array, and programmable logic device).

In the above embodiments, the operations of the processor may be Implemented by a single processor or by plural processors, which are located physically apart from one another, working cooperatively. Further, the order of operations of the processor is not limited to one described in the embodiments above, and may be changed as appropriate.

The face image processing device has been described above as an example of the embodiment. The embodiment may be in a form of a program for causing a computer to function as each part included in the face image processing device. The embodiment may be in a form of a storage medium that can be read by the computer storing the program.

Further, in each of the above embodiments, an example in which the three-dimensional face shape model 12Q is implemented by the linear sum of the average shape and the basis has been described, but the disclosed technique is not limited thereto. For example, the three-dimensional face shape model 12Q may be in a form Implemented by a tensor product of the average shape and the basis.

Further, in each of the above embodiments, an example in which this disclosure is applied to a face of an occupant of a vehicle has been described, but the disclosed technology is not limited thereto. For example, this disclosure may be applied to a face of a personal computer user, a face of a smartphone user, and the like.

In addition, a configuration of the face image processing device described in each of the above embodiments is an example, and may be changed depending on situations without departing from a gist.

For example, a processing flow of the face image processing program described in each of the above embodiments is also an example, and an unnecessary step may be deleted, a new step may be added, or the processing order may be changed without departing from the gist.

Further, the various mathematical formulas described in each of the above embodiments are examples, and it goes without saying that various modifications may be added to each mathematical formula.

A face image processing device according to a first aspect of this disclosure includes: an image coordinate system coordinate value derivation unit configured to detect an x-coordinate value which is a horizontal coordinate value and a y-coordinate value which is a vertical coordinate value respectively in an image coordinate system at a feature point of an organ of a face of a person in an image acquired by imaging the face, and estimate a z-coordinate value which is a depth coordinate value in the image coordinate system, so as to derive three-dimensional coordinate values in the image coordinate system; a camera coordinate system coordinate value derivation unit configured to derive three-dimensional coordinate values in a camera coordinate system from the three-dimensional coordinate values in the image coordinate system derived by the image coordinate system coordinate value derivation unit; and a parameter derivation unit configured to apply the three-dimensional coordinate values in the camera coordinate system derived by the camera coordinate system coordinate value derivation unit to a predetermined three-dimensional face shape model to derive a model parameter of the three-dimensional face shape model in the camera coordinate system.

The face image processing device according to a second aspect of this disclosure is directed to the face image processing device according to the first aspect of this disclosure, in which the image coordinate system coordinate value derivation unit is configured to derive the z-coordinate value by estimating the z-coordinate value using deep learning in parallel with the detection of the x-coordinate value and the y-coordinate value.

The face image processing device according to a third aspect of this disclosure is directed to the face image processing device according to the first or second aspect of this disclosure, in which the three-dimensional face shape model is formed of a linear sum of an average shape and a basis, and the basis is separated into an individual difference basis, which is a component that does not change with time, and a facial expression basis, which is a component that changes with time, and the model parameter includes a parameter of the individual difference basis and a parameter of the facial expression basis.

The face image processing device according to a fourth aspect of this disclosure is directed to the face image processing device according to the third aspect of this disclosure, in which the model parameter further includes a position and orientation parameter indicating a position and an orientation of the face of the person as viewed from a camera that images the face of the person.

The face image processing device according to a fifth aspect of this disclosure is directed to the face image processing device according to any one of the first to fourth aspects of this disclosure, in which the face image processing device further includes: a face distance estimation unit configured to estimate a distance to the face of the person, and the camera coordinate system coordinate value derivation unit is configured to derive the z-coordinate value in the camera coordinate system by using the distance estimated by the face distance estimation unit.

The face image processing device according to a sixth aspect of this disclosure is directed to the face image processing device according to any one of the first to fifth aspects of this disclosure, in which the face image processing device further includes: a coordinate correction unit configured to correct the z-coordinate value, which is derived by the image coordinate system coordinate value derivation unit, according to a position of the face in the image.

The face image processing device according to a seventh aspect of this disclosure is directed to the face image processing device according to any one of the first to sixth aspects of this disclosure, in which the face image processing device further includes: a weight setting unit configured to set independent weights for respective error evaluation values of the x-coordinate value, the y-coordinate value, and the z-coordinate value at each feature point of each organ of the face.

A face image processing program according to an eighth aspect of this disclosure causes a computer to execute processing of: detecting an x-coordinate value which is a horizontal coordinate value and a y-coordinate value which is a vertical coordinate value respectively in an image coordinate system at a feature point of an organ of a face of a person in an image acquired by imaging the face, and estimating a z-coordinate value which is a depth coordinate value in the image coordinate system, so as to derive three-dimensional coordinate values in the image coordinate system; deriving three-dimensional coordinate values in a camera coordinate system from the derived three-dimensional coordinate values in the image coordinate system; and applying the derived three-dimensional coordinate values in the camera coordinate system to a predetermined three-dimensional face shape model to derive a model parameter of the three-dimensional face shape model in the camera coordinate system.

According to this disclosure, it is possible to provide a face image processing device and a face image processing program that can accurately estimate a parameter of a three-dimensional face shape model.

Further, in each of the above embodiments, a case, in which the processing according to the embodiment is implemented with a software configuration by using the computer by executing the face image processing program, is described, and this disclosure is not limited thereto. The embodiment may be implemented by, for example, a hardware configuration or a combination of the hardware configuration and the software configuration.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A face image processing device, comprising:
at least one processor configured to implement:
an image coordinate system coordinate value derivation unit configured to detect an x-coordinate value which is a horizontal coordinate value and a y-coordinate value which is a vertical coordinate value respectively in an image coordinate system at a feature point of an organ of a face of a person in an image acquired by imaging the face, and estimate a z-coordinate value which is a depth coordinate value in the image coordinate system, so as to derive three-dimensional coordinate values in the image coordinate system;
a camera coordinate system coordinate value derivation unit configured to derive three-dimensional coordinate values in a camera coordinate system from the three-dimensional coordinate values in the image coordinate system derived by the image coordinate system coordinate value derivation unit; and
a parameter derivation unit configured to apply the three-dimensional coordinate values in the camera coordinate system derived by the camera coordinate system coordinate value derivation unit to a predetermined three-dimensional face shape model to derive a model parameter of the three-dimensional face shape model in the camera coordinate system.

2. The face image processing device according to claim 1, wherein
the image coordinate system coordinate value derivation unit is configured to derive the z-coordinate value by estimating the z-coordinate value using deep learning in parallel with the detection of the x-coordinate value and the y-coordinate value.

3. The face image processing device according to claim 1, wherein
the three-dimensional face shape model is formed of a linear sum of an average shape and a basis, and the basis is separated into an individual difference basis, which is a component that does not change with time, and a facial expression basis, which is a component that changes with time, and
the model parameter includes a parameter of the individual difference basis and a parameter of the facial expression basis.

4. The face image processing device according to claim 3, wherein
the model parameter further includes a position and orientation parameter indicating a position and an orientation of the face of the person as viewed from a camera that images the face of the person.

5. The face image processing device according to claim 1, further comprising:
a face distance estimation unit configured to estimate a distance to the face of the person, wherein
the camera coordinate system coordinate value derivation unit is configured to derive the z-coordinate value in the camera coordinate system by using the distance estimated by the face distance estimation unit.

6. The face image processing device according to claim 1, further comprising:
a coordinate correction unit configured to correct the z-coordinate value, which is derived by the image coordinate system coordinate value derivation unit, according to a position of the face in the image.

7. The face image processing device according to claim 1, further comprising:
a weight setting unit configured to set independent weights for respective error evaluation values of the x-coordinate value, the y-coordinate value, and the z-coordinate value at each feature point of each organ of the face.

8. A face image processing program stored in a non-transitory computer readable medium configured to cause a computer to execute processing, the processing comprising:
detecting an x-coordinate value which is a horizontal coordinate value and a y-coordinate value which is a vertical coordinate value respectively in an image coordinate system at a feature point of an organ of a face of a person in an image acquired by imaging the face, and estimating a z-coordinate value which is a depth coordinate value in the image coordinate system, so as to derive three-dimensional coordinate values in the image coordinate system;

deriving three-dimensional coordinate values in a camera coordinate system from the derived three-dimensional coordinate values in the image coordinate system; and applying the derived three-dimensional coordinate values in the camera coordinate system to a predetermined three-dimensional face shape model to derive a model parameter of the three-dimensional face shape model in the camera coordinate system.

* * * * *